J. L. LEAS.
Corn Planter.
No. 82,422.
Patented Sept. 22, 1868.
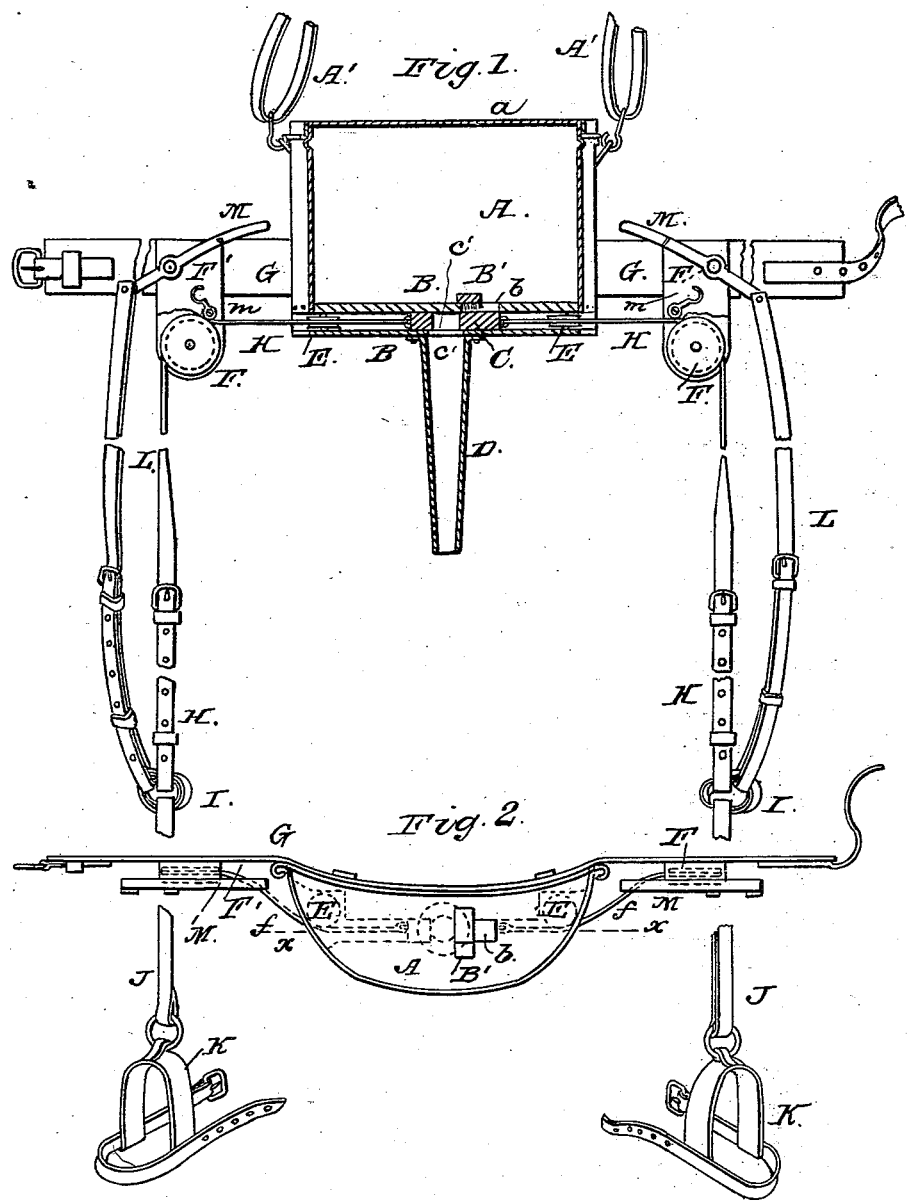

United States Patent Office.

JOHN L. LEAS, OF YORK SULPHUR SPRINGS, PENNSYLVANIA, ASSIGNOR TO HIMSELF AND ANDREW B. LEREW, OF SAME PLACE.

Letters Patent No. 82,422, dated September 22, 1868.

IMPROVEMENT IN CORN-PLANTERS.

*The Schedule referred to in these Letters Patent and making part of the same.*

TO ALL WHOM IT MAY CONCERN:

Be it known that I, JOHN L. LEAS, of York Sulphur Springs, in the county of Adams, and in the State of Pennsylvania, have invented certain new and useful Improvements in Corn-Planters; and I do hereby declare that the following is a full, clear, and exact description thereof, reference being had to the accompanying drawings, which make part of this specification, and in which—

Figure 1 represents a vertical section of my improved corn-planter at the line $x\ x$ of fig. 2, and Figure 2 a plan or top view of the same.

The object of my invention is to provide a simple and convenient device for planting corn, which can be carried by a man and operated by the movements of his feet in walking; to which ends, my improvement consists in a box or hopper for holding the corn, provided with straps, by which it is secured to a man's body, and having a double bottom in which a slotted slide is placed, which feeds the corn to the spout, and is connected by straps with the feet of the operator in such manner as to discharge the corn from the spout at every alternate step, a device being provided for throwing it out of gear when required, as hereinafter described.

In the accompanying drawings, which show a convenient arrangement of parts for carrying out the objects of my invention, A represents the box or hopper for containing the corn, which is formed of any convenient sheet metal, and closed by a cover, $a$. This box is curved on its inner side, as shown in the drawings, so as to fit conveniently against the abdomen of a man, to which it is secured by the shoulder-strap $A'$ and waist-strap G.

The box A is provided with a double bottom, B, in the upper and lower sections of which are formed the slots $b\ c'$, the said slots being in different vertical planes. In the space between the upper and lower sections of the bottom is placed the slide C, provided with a slot, $c$. Immediately beneath the lower slot $c'$ is secured the spout D, through which the corn is delivered. A brush, $B'$, is placed at that end of the slot $b$ which is nearest the spout D, the fibres of which being of a yielding nature, free the slide C from the corn that drops upon it over and above that which is to be delivered by its succeeding movement, and without injury to the grains.

The slide C receives its movements from those of the feet of the operator by means of the straps H, which are fastened to its ends, and passing around the sheaves E in the bottom, B; and sheaves F, working in blocks $F'$ secured to the waist-strap G, are united, by connections, I, of gum or other suitable elastic material, to the leg-straps J, to the lower ends of which are attached the feet-straps K, which are buckled to the feet of the operator.

From this arrangement, it will be seen that the movement of the left leg of the operator in walking brings the slide C in position to have its slot $c$ filled with corn through the upper slot $b$, while the movement of the right leg moves it in the reverse direction, bringing the slot $c$ over the lower slot $c'$, and thereby dropping the corn through the spout D at every alternate step.

The movements of the slide can be stopped in turning corners, &c., as desired, and the dropping of the corn consequently discontinued, by the following device:

Levers M are pivoted to the blocks $F'$, having attached to them straps, L, which are connected to the elastic connections I. The latter should be made sufficiently stiff as not to stretch enough to impair the working of the slide C when the machine is in operation, but when it is desired to stop the movements of the slide, pressure is exerted upon the ends of the levers M, which, acting upon the elastic connections I, by means of the straps L, stretches them so far that the straps H become slack, and the movement of the slide C consequently ceases. The levers M can be held in this position by means of the hooks $m$ pivoted to the blocks $F'$, and engaging in staples on the levers.

The straps H and L are provided with buckles, so as to allow their length to be regulated to suit the height of the operator.

Having thus fully described my invention, what I claim therein as new, and desire to secure by Letters Patent, is—

1. The slide C, in combination with the sheaves E F and straps H, J, and K, as and for the purpose described.

2. The pivoted levers M and straps L, in combination with the elastic connections I, as and for the purpose described.

The above specification signed by me, this 30th day of July, A. D. 1868.

JOHN L. LEAS.

Witnesses:
LEWIS SNIDER,
J. A. R. MCBRIDE.